(12) United States Patent
Gindorf et al.

(10) Patent No.: US 10,563,769 B2
(45) Date of Patent: Feb. 18, 2020

(54) METHOD FOR MANUFACTURING A BRUSH SEAL WITH INCLINED BRISTLE

(71) Applicant: MTU Aero Engines AG, Munich (DE)

(72) Inventors: Alexander Gindorf, Schwabhausen (DE); Joachim Bamberg, Dachau (DE); Guenter Zenzinger, Waakirchen (DE)

(73) Assignee: MTU Aero Engines AG, Munich (DE)

( * ) Notice: Subject to any disclaimer, the term of this patent is extended or adjusted under 35 U.S.C. 154(b) by 532 days.

(21) Appl. No.: 15/400,181

(22) Filed: Jan. 6, 2017

(65) Prior Publication Data
US 2017/0204975 A1 Jul. 20, 2017

(30) Foreign Application Priority Data

Jan. 14, 2016 (DE) .......................... 10 2016 200 343

(51) Int. Cl.
| | |
|---|---|
| *F16J 15/32* | (2016.01) |
| *F16J 15/328* | (2016.01) |
| *A46B 3/08* | (2006.01) |
| *A46D 9/00* | (2006.01) |
| *A46D 3/05* | (2006.01) |
| *F16J 15/3288* | (2016.01) |

(52) U.S. Cl.
CPC ............... *F16J 15/328* (2013.01); *A46B 3/08* (2013.01); *A46D 3/05* (2013.01); *A46D 9/00* (2013.01); *F16J 15/3288* (2013.01); *F05D 2240/56* (2013.01)

(58) Field of Classification Search
CPC ........ F16J 15/328; F16J 15/3288; A46B 3/08; A46D 3/05; A46D 9/00; F05D 2240/56

USPC ........................................................ 72/342.94
See application file for complete search history.

(56) References Cited

U.S. PATENT DOCUMENTS

| | | | | |
|---|---|---|---|---|
| 4,730,876 A | * | 3/1988 | Werner ..................... | A46D 3/05 140/92.2 |
| 5,732,466 A | * | 3/1998 | Bouchard ................. | A46D 9/02 29/888.3 |
| 6,299,824 B1 | * | 10/2001 | Mayr ........................ | A46B 3/08 266/252 |

(Continued)

FOREIGN PATENT DOCUMENTS

| | | |
|---|---|---|
| DE | 3606284 C2 | 5/1987 |
| DE | 19641375 C1 | 12/1997 |

(Continued)

*Primary Examiner* — David B Jones
(74) *Attorney, Agent, or Firm* — Barlow, Josephs & Holmes, Ltd.

(57) ABSTRACT

The invention relates to a method for manufacturing a brush seal with inclined bristles. In order to be able to manufacture these brush seals in an especially cost-effective manner, at least the following steps are provided: provision of a brush blank with at least one metal thread or wire packing fastened at or in at least one wire core; local, at least partial heating of at least the wire core and/or a subregion of the thread or wire packing adjacent to the wire core, by a current flow through the wire core; bending of the thread or wire packing relative to the wire core for producing of the inclined position of the bristles of the brush seal. The invention further relates to an apparatus for manufacturing brush seals and a brush seal for a turbomachine, in particular for an aircraft engine.

9 Claims, 2 Drawing Sheets

(56) References Cited

U.S. PATENT DOCUMENTS

Figure 1:
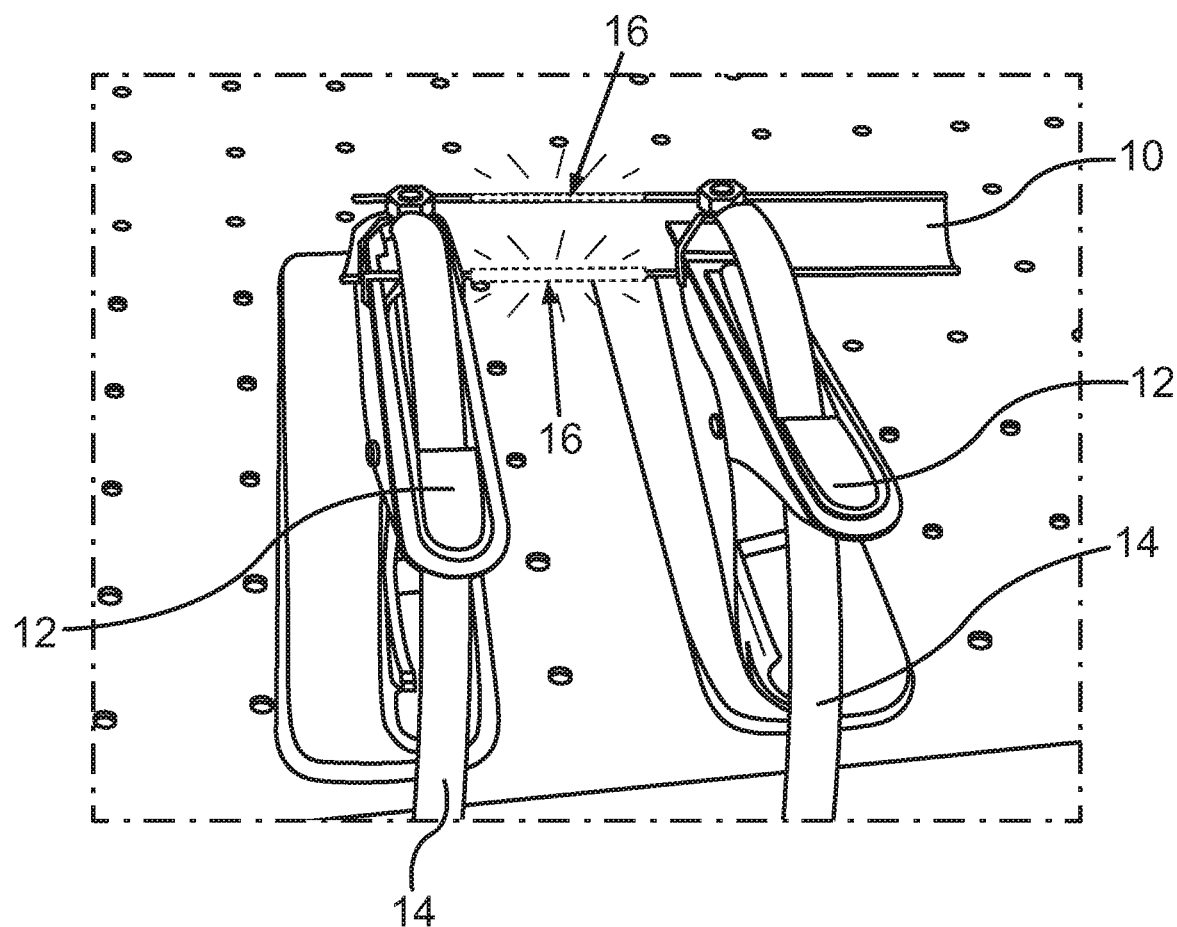

| | | | | |
|---|---|---|---|---|
| 7,578,509 | B2* | 8/2009 | Grondahl | F16J 15/3292 |
| | | | | 277/303 |
| 10,201,845 | B2* | 2/2019 | Gindorf | B21F 3/00 |
| 2002/0190473 | A1 | 12/2002 | Tong et al. | |
| 2007/0214628 | A1 | 9/2007 | Adis et al. | |
| 2011/0272891 | A1 | 11/2011 | Adis et al. | |
| 2018/0045317 | A1* | 2/2018 | Kono | F01D 11/00 |

FOREIGN PATENT DOCUMENTS

| | | |
|---|---|---|
| DE | 19746184 A1 | 4/1999 |
| DE | 10250160 A1 | 6/2003 |
| DE | 10315105 B3 | 8/2004 |
| DE | 102007014843 A1 | 1/2008 |
| DE | 102015208224 A1 | 12/2016 |
| EP | 0211275 A2 | 2/1987 |
| EP | 2789805 A1 | 10/2014 |
| WO | 2006065254 A1 | 6/2006 |
| WO | 2006065284 A1 | 6/2006 |

\* cited by examiner

METHOD FOR MANUFACTURING A BRUSH SEAL WITH INCLINED BRISTLE

BACKGROUND OF THE INVENTION

The present invention relates to a method for manufacturing a brush seal with inclined bristles. The invention further relates to a device for manufacturing a brush seal as well as a brush seal for a turbomachine.

The manufacture of brush seals with inclined bristles is known from publication DE 36 06 284 C2, for example. In it, a metal thread or wire is wound over two wire cores, which are arranged at a distance parallel to each other, to create a tight metal thread or wire packing. The metal thread or wire packing is then fixed to an appropriate wire core by a clamping strip. The clamping strips and/or wire cores are then shifted parallel to each other at room temperature by a frame. High forces are required for this. In the process, the bristles in the vicinity of the wire core bend and a so-called laying angle is created. In order to fix the laying angle of the bristles, the brush seal is subjected to a subsequent thermal treatment. Here, the frame with the clamped brush seal is stress-relief annealed in an oven for one hour, for example, at a temperature between 500° C. and 1,000° C. In this process, the frame undergoes wear and has to be replaced regularly. Moreover, on account of the wear on the frame, a rolling process is also needed to adjust the correct outer diameter of the clamping strip both prior to and after the thermal treatment.

SUMMARY OF THE INVENTION

The object of the present invention is to create a method for manufacturing a brush seal with inclined bristles, said method being especially cost-effective. In addition, it is an object of the invention to provide a device for manufacturing brush seals. Furthermore, it is an object of the invention to make available a brush seal with inclined bristles for a turbomachine, in particular for an aircraft engine, said brush seal being especially cost-effective.

These objects are achieved by a method, an apparatus, and a brush seal of the present invention. Advantageous embodiments with appropriate enhancements of the invention are presented below, in which advantageous embodiments of the method, the apparatus, and the brush seal are each to be regarded as reciprocally advantageous embodiments.

A first aspect of the invention relates to a method for manufacturing a brush seal with inclined bristles. In said method, a brush blank with at least one metal thread or wire packing fastened at or in at least one wire core is provided. The wire core and/or a subregion of the thread or wire packing adjacent to the wire core are or is heated at least in part locally. The thread or wire packing is bent relative to the wire core in order to create the inclined position of the bristles of the brush seal. As a result of this bending, the so-called laying angle of the brush seal is adjusted. The brush seal is stress-relief annealed by the local heating. Internal stresses created by the bending are thereby reduced in the thread or wire packing. As a result, the brush seal retains its laying angle after bending. The bending is also referred to as deformation.

In accordance with the invention, it is provided in this case that the wire core and/or the subregion of the thread or wire packing adjacent to the wire core is heated locally at least in part conductively by a flow of current through the wire core. Thus, for example, a flow of current through at least a subregion of the wire core is brought about by contact with a voltage source and/or a current source. For this, the wire core is designed to be electrically conductive; for example, it is made of a metallic material. The local heating is thus brought about according to the principle of resistance heating. The local conductive heating in this case is especially fast and is highly efficient. The wire core can thus be heated locally within a few seconds, for example, for the annealing. In contrast to inductive local heating, for example, it is thus possible to dispense in this case with complicated or expenses control devices and/or electronics. Likewise, it is not necessary to provide induction coils in a heating device. Instead of this, just simple electrical contact elements are needed, for example.

The thread or wire packing is compared of the bristle material and may also be referred to as a bristle packing. In the finished brush seal, it forms the bristles thereof. During the bending, a subregion of the thread or wire packing located outside of the wire core is usually bent relative to a subregion of the thread or wire packing fastened in or at the wire core for creation of the inclined position of the bristles of the brush seal. The heating may also be referred to as heating up or warming up. By the local conductive heating, the thread or wire packing is stress-relief annealed locally at least at a bending point.

Preferably, the heating is performed immediately prior to the bending, so that especially low forces are required for bending the thread or wire packing material, which is softened owing to its heated temperature. As a result of the local heating, it is possible to dispense with an energy-intensive heating of the entire brush seal in an oven. In this case, a holding apparatus in the form of a frame, for example, is not heated or is heated only slightly by thermal conduction from the wire core and/or the thread or wire packing. As a result, substantially less energy is needed for heating and the brush seal can thereby be manufactured in an especially cost-effective and fast manner. Moreover, a holding apparatus for holding and/or bending the thread and wire packing thus undergoes hardly any wear or no wear at all during the heating.

In another advantageous embodiment of the method according to the invention, it is provided that, for local heating, two poles of a power source are placed in electrical contact with the wire core and/or with the thread or wire packing at two points that are distanced from each other by the respective contact elements. By the two contact elements and the contact position thereof at the brush blank, it is possible to define a path of current flow through the brush blank. The brush blank undergoes local conductive heating depending on this path of current flow. As a result, during the local heating, defined subregions can be heated especially strongly and other subregions can be hardly heated or not heated at all. The contact elements can be formed as metal clamps, for example. The contact elements can also be designed alternatively as simple metal pins, which are placed in contact with the brush blank at specific points thereof.

In another advantageous embodiment of the method according to the invention, it is provided that an alternating current and/or a direct current are or is utilized for local conductive heating. When direct current is used, it is possible to bring about a complete heating throughout at least the regions through which current flows. When alternating current is used, the penetration depth during the local heating can be controlled, this also being referred to as modulation of the penetration depth.

In another advantageous embodiment of the method according to the invention, it is provided that, for bending of the thread or wire packing, the wire core is held by a first holding device and a subregion of the thread or wire packing that is distanced from the wire core is held by a second holding device, with it being possible for these two holding devices to be shifted in position and/or twisted relative to each other for creation of the inclined position of the bristles. To this end, the thread or wire packing and/or the wire core can be clamped in the respective holding devices, in particular. As a result of the mutual shift in position and/or twisting, it is possible to adjust a specific laying angle in an especially simple manner. Preferably, in this case, respective electrical contact elements are contacted with the thread or wire packing and/or with the wire core in such a way that their contact is not interrupted by the shift in position and/or twisting of the holding device. Respective contact elements can be moved together with the holding devices for this purpose.

In another advantageous embodiment of the method according to the invention, it is provided that, as brush blank, a blank is provided in which the metal thread or wire packing is fastened by two opposite-lying end regions in or at each wire core, wherein, for bending of the thread or wire packing, the wire core of the brush blank is held by a holding device in each case, and the respective holding devices are shifted in position and/or twisted relative to one another in order to create the inclined position of the bristles. As a result, two brush seals can be produced in a single bending operation.

In another advantageous embodiment of the method according to the invention, it is provided that, after bending has taken place, the thread or wire packing is severed between the two wire cores. In this way, it is possible to produce two brush seals from a single thread or wire packing in an especially simple manner. In this case, the severing can occur prior to or after the local conductive heating. However, the severing can also occur during the local conductive heating.

In another advantageous embodiment of the method according to the invention, it is provided that, during local conductive heating of the wire core, the subregion of the thread or wire packing adjacent to the wire core is heated by thermal conduction by the wire core. In this case, it is possible, for example, to heat only the wire core in a locally conductive manner by the current flow. This heating can then be adjusted especially well, because the wire core has a defined geometry. By contrast, the thread or wire packing can be heated only irregularly, as the case may be, by a current flow on account of irregularly distributed threads and/or wires. An actual bending point of the thread or wire packing is accordingly heated secondarily by thermal conduction. In particular, the bending point and/or exit point of the thread or wire packing from the wire core can nonetheless additionally undergo direct local conductive heating by a flow of current all the way through it in order to achieve an especially fast heating of this region of the thread or wire packing.

In another advantageous embodiment of the method according to the invention, it is provided that the wire core is provided as a C-shaped element, in particular as a C-tube, and the thread or wire packing is heated conductively and/or by thermal conduction at least at the exit from the C-tube. As a result, the heating can occur very fast and with little holding time, with markedly reduced forces for producing the laying angle. The main difference from a global thermal treatment is the heating of the C-tube and respective core wires by conduction by the principle of resistance heating. The heating of the brush wires occurs locally in this case by current flow and/or thermal conduction at the point of exit from the C-tube.

A second aspect of the invention relates to an apparatus for manufacturing a brush seal with inclined bristles. In accordance with the invention, the brush seal is produced from a brush blank with at least one wire core and with at least one thread or wire packing fastened in or at the wire core, wherein the apparatus comprises at least one bending device for bending the thread or wire packing relative to the wire core and at least one heating device for local conductive, at least partial heating of the wire core and/or at least one subregion of the thread or wire packing adjacent to the wire core by the current flow. The apparatus according to the second aspect of the invention is therefore suitable for carrying out the manufacturing method according to the first aspect of the invention. The features and advantages ensuing from the use of the method according to the first aspect of the invention may be taken from the descriptions of the first aspect of the invention, with advantageous embodiments of the first aspect of the invention to be regarded as advantageous embodiments of the second aspect of the invention and vice versa.

The bending device can clamp the brush blank, for example. In particular, the bending device can comprise respective holding devices, which can be shifted in position and/or twisted relative to one another. The heating device can comprise, for example, a current source and/or a voltage source for generation of an alternating current or a direct current. Alternatively, the heating device can also comprise, for example, a transformer, by which a power supply made available from a power grid can be transformed into a suitable voltage and/or type of current.

In another advantageous embodiment of the apparatus according to the invention, it is provided that the bending device comprises respective ceramic fastening elements for holding the wire cores and/or thread or wire packings of the brush blank. In this case, the fastening elements can be parts of the holding devices that can be moved relative to one another. As a result of the use of ceramic fastening elements, there is no wear or only an especially small wear of the bending device owing to local conductive heating. In contrast to global heating in an oven, substantial wear of a frame for holding the brush blank does not occur due to the heating, as a result of which the frame would need to be replaced regularly. For this purpose, it is possible to employ a ceramic resistant to high temperatures, such as, for example, a glass ceramic like Ni3N4. The fastening elements can be designed as clamping jaws, for example. In particular, the fastening elements can extend over an entire lengthwise extension of the wire cores and/or the thread or wire packing so as to be able to clamp the brush blank especially well.

In another advantageous embodiment of the apparatus according to the invention, it is provided that the respective fastening elements of the bending device can be shifted in position and/or twisted relative to one another along a guide. In this way, it is possible to adjust the laying angle of the brush seal in an especially precise manner.

In another advantageous embodiment of the apparatus according to the invention, it is provided that the heating device comprises at least two contact elements for electrical contacting of a power source with the at least one wire core. In this way, it is possible to define a path of the current flow through the wire core in an especially simple manner. Very simple parts, such as metal pins, for example, can thus be employed as contact elements. Alternatively, it can also be provided that one of the contact elements or both of the contact elements is or are contacted with the thread or wire packing. The contact elements are then designed correspondingly for a contacting with the thread or wire packing. If a brush blank with two wire cores and a thread or wire packing clamped in between is employed as brush blank, the heating device can comprise two contact elements per wire core. The thread or wire packing can then be heated conductively locally at both bending points at the same time.

In another advantageous embodiment of the apparatus according to the invention, it is provided that the heating device and the bending device are designed as devices that are functionally independent of each other. This can mean that the heating device and the bending device can be utilized independent of each other. The bending device can bend the thread or wire packing, without the heating device needing to contact the brush blank. Likewise, the heating device can be contacted with the brush blank independently of the bending device. Likewise, the functional independence can mean that the two devices can be serviced independently. For example, respective contact elements of the heating device can be replaced, without it being necessary to replace the respective fastening elements of the bending device. However, the functional independence of the two devices need not mean that they should not be fastened to each other. For example, respective contact elements of the heating device can be fastened for contacting the brush blank at the bending device and, in particular, at the fastening jaws thereof. The contact elements can thus move together with the fastening jaws during bending and remain in contact with the brush blank.

A third aspect of the invention relates to a brush seal with inclined bristles for a turbomachine, in particular for an aircraft engine. In accordance with the invention, it is proposed in this case that the brush seal be manufactured by a method according to the first aspect of the invention and/or by an apparatus according to the second aspect of the invention. The features and advantages ensuing from the use of the method according to the first aspect of the invention or from the use of the apparatus according to the second aspect of the invention may be taken from the descriptions of the first or second aspect of the invention, respectively, with advantageous embodiments of the first or second aspect of the invention, respectively, to be regarded as advantageous embodiments of the third aspect of the invention and vice versa.

In this case, the brush seal is especially cost-effective, because the method for manufacturing it is especially efficient and cost-effective. In particular, the method according to the first aspect of the invention is more cost-effective and simpler than a manufacturing method in which the brush blank is globally heated or in which the brush blank undergoes local inductive heating. Likewise, the apparatus for manufacture according to the second aspect of the invention is more cost-effective than an apparatus that provides for global heating of the brush blank or local inductive heating.

BRIEF DESCRIPTION OF THE DRAWING FIGURES

Further advantages, features, and details of the invention ensue from the following description of a preferred exemplary embodiment as well as on the basis of the drawings. The features and combinations of features mentioned in the description above as well as below in the description of the figures and/or the features and combinations of features shown solely in the figures can be used not only in the respectively presented combinations, but also in other combinations or alone, without departing from the scope of the invention.

Figure 2:
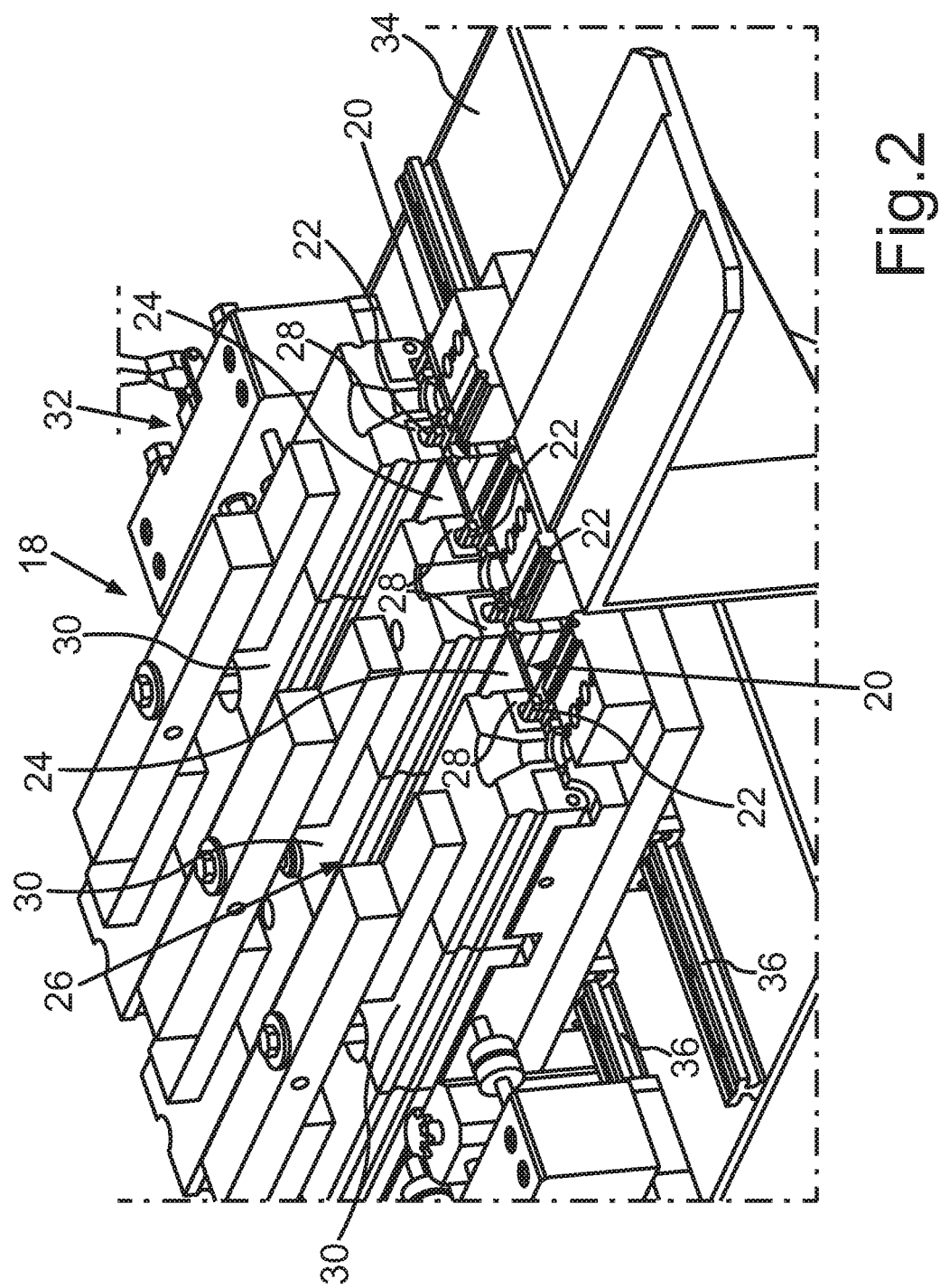

FIG. 1 illustrates a local, conductive heating of a wire core in a perspective view; and FIG. 2 shows, by way of a section in a schematic perspective view, an apparatus for manufacturing a brush seal with inclined bristles.

DESCRIPTION OF THE INVENTION

FIG. 1 shows, in a schematic perspective view, a local, conductive heating of a wire core 10 of a brush seal. This wire core 10 is contacted electrically at two points that are spaced apart from each other with a pole of a power source by respective contact elements 12. In this case, the contact elements 12 are designed, for example, as metal clips, which are connected to a power source, which is not shown, by respective power cable 14. Via these contact elements 12, a direct current generated by the power source flows through the wire core 10 between the contact elements 12. As a result, the wire core 10 can undergo local conductive heating between the two contact elements 12 locally along the path of the current flow.

This local conductive heating occurs in this case according to the principle of resistance heating. It can be seen here that the wire core 10 is heated locally for annealing only in the two subregions 16 by the current flow. The local heating therefore occurs essentially only in those regions of the wire core 10 through which the current also flows. The subregions 16 of the wire core 10 can thus be heated within a few seconds to a temperature of 500° C. to 1000° C. Adjacent regions of the wire core 10 are heated slightly only by thermal conduction from these subregions 16.

The efficiency of such a local conductive heating is especially great. Namely, in contrast to global heating in an oven, it is not necessary to preheat an oven chamber. Subregions of the wire core 10 and of an apparatus for holding the wire core 10 that are not to be heated for stress-relief annealing of brush seals are not heated directly. In contrast to local inductive heating, no complicated or expensive control devices and/or induction coils are needed. The contact elements 12 are available as low-cost standard components.

FIG. 2 shows, in a schematic perspective view by way of a section, an apparatus 18 for manufacturing a brush seal with inclined bristles for an aircraft engine, for example. In this case, the brush seal is produced from a brush blank 20, which comprises two wire cores 22 and a metal thread or wire packing 24 that is wound between these two wire cores 22. The wire core 22 is made of a material that is heated according to the principle of resistance heating when current flows through it. In the exemplary embodiment illustrated, the wire core 22 is composed of a metal material. The wire core 22 can also be designed identically to the wire core 10 shown in FIG. 1.

For manufacture of the brush seal, the wire cores 22 and/or respective subregions of the thread or wire packing 24 adjacent to the wire core 22 undergo locally at least partial conductive heating. The underlying conductive heating principle was already discussed on the basis of FIG. 1. The thread or wire packing 24 is then bent relative to the wire cores 22 in order to create an inclined position of the bristles of the brush seal. In this way, it is possible to establish a so-called laying angle of the bristles of the brush seal to be manufactured. The thread or wire packing 24 is then severed in the middle, for example, between the two wire cores 22, as a result of which two brush seals can be manufactured at the same time.

For this manufacture, the apparatus 18 comprises at least one bending device 26 for bending the thread or wire packing 24 relative to the wire core 22. In this case, the bending device 26 comprises respective ceramic fastening elements 28, which are designed as clamping jaws. Wire cores 22 are clamped in the clamping jaws. The fastening elements 28 are made of a high-temperature resistant glass ceramic, such as Ni3N4, and are arranged over an entire length of the wire core 22. In this case, the fastening elements 28 are each held on a guide 30 so as to be able to be moved. The movement results in the bending of the thread or wire packing 24. The guides 30 permit a relative transversal shift in position of the fastening elements 28 in a plane that corresponds to a main extension of the thread or wire packing 24.

The apparatus 18 further comprises a heating device 32 for the local conductive, at least partial heating of the wire core 22 and/or of partial regions of the thread or wire packing 24 adjacent to the wire core 22 by a current flow. The respective contact elements of the heating device 32 themselves are not illustrated in FIG. 2. For example, the contact elements can be designed as metal pins, which, through openings in the guides 30, can be brought into contact with the wire core 22 and/or the subregions of the thread or wire packing 24 adjacent to the wire core 22. In addition, the heating device 32 comprises a power source that is likewise not illustrated. By this power source, a direct current is generated for local conductive heating. By the direct current, a complete subregion of the wire core 22, through which current flows, can be heated. Alternatively, it is possible by the power source also to supply an alternating current, as a result of which a penetration depth of the local conductive heating can be modulated.

In the apparatus 18, there is a functional separation of a clamping of the brush blank 20 and the local conductive heating thereof. In this way, it is possible to use respective ceramic fastening elements 28 with a shape adapted to the wire core 22, the thread or wire packing 24, and/or the brush blank 20. Respective contacts for in-coupling of current are not part of the clamping of the brush blank 20. As a result, the bending device 26 and the heating device 32 can be serviced independently of each other. In particular, respective parts can be replaced independently of each other.

It is possible by the apparatus 18 according to the exemplary embodiment to manufacture four brush seals with inclined bristles at the same time. For this, two brush blanks 20, each with two wire cores 22 and a thread or wire packing 24, need to be provided. In this case, the central clamping of the apparatus 18 can clamp two wire cores 22 of two different brush blanks 20 at the same time.

Furthermore, it can be seen that the apparatus 18 for manufacturing the brush seal is mounted on a work bench 34 by a plurality of rails 36. The mounting of guides 30 on the rails 36 enables the distance between them to be adjusted. In this way, it is possible to process brush blanks 20 with thread or wire packings 24 of different length and to manufacture brush seals with bristles of different length. By the apparatus 18, respective brush seals or brush blanks 20 can be stress-relief annealed directly at the site of their deformation or bending. In this case, it is possible to reduce substantially respective throughput times during the manufacture of brush seals with inclined bristles. The ceramic fastening elements 28 are low-wear on account of the glass ceramic employed.

The thread or wire packing 24 or the bristles of the brush seal are fixed in place on the wire cores 22 of the brush blank 20 by respective clamping strips, which are not illustrated in detail. For this purpose, respective clamping strips are pushed over the wire cores 22. In this case, the clamping strips can be put in place both prior to and after the bending and also prior to or after the thermal treatment. The wire cores 22 can be designed as C-shaped tubes, for example. In this case, the thread or wire packing 24 is heated both secondarily by heat conduction from the locally conductively heated wire core 22 at its exit point from the wire core 22 or C-tube, respectively and also directly by passing current likewise through the thread or wire packing 24 locally at its exit point.

What is claimed is:

1. A method for manufacturing a brush seal with inclined bristles, comprising at least the steps of:
   providing a brush blank with at least one metal thread or wire packing fastened at or in at least one wire core;
   locally, at least partial heating of at least the wire core and/or a subregion of the thread or wire packing adjacent to the wire core;
   bending the thread or wire packing relative to the wire core for producing the inclined position of the bristles of the brush seal;
   wherein the wire core and/or the subregion of the thread or wire packing adjacent to wire core is heated locally at least in part conductively by a current flow through the wire core.

2. The method according to claim 1, wherein, for local heating, two poles of a power source are contacted electrically at two points that are distant from each other with the wire core and/or with the thread or wire packing by respective contact elements.

3. The method according to claim 1, wherein, for local conductive heating, an alternating current and/or a direct current is utilized.

4. The method according to claim 1, wherein, for bending of the thread or wire packing the wire core is held by a first holding device and a subregion of the thread or wire packing that is distanced from the wire core is held by a second holding device, with these two holding devices being shifted in place or twisted relative to each other to produce the inclined position of the bristles.

5. The method according to claim 1, wherein, as brush blank, a blank in which the metal thread or wire packing is fastened with two opposite-lying end regions, each in or at a wire core is provided, wherein, for bending of the thread or wire packing, the wire cores of the brush blank are held in each case by a holding device and the respective holding devices are shifted in place and/or twisted relative to each other to produce the inclined position of the bristles.

6. The method according to claim 5, wherein, after bending, the thread or wire packing is severed between the two wire cores.

7. The method according to claim 1, wherein, during the conductive local heating of the wire core, the subregion of the thread or wire packing adjacent to the wire core is heated by thermal conduction of the wire core.

8. The method according to claim 1, wherein the wire core is provided as a C-tube element, and the thread or wire packing is heated at least at the exit from the C-tube conductively and/or by thermal conduction.

9. The method according to claim 1, wherein the brush seal is configured and arranged for use in an aircraft engine.

* * * * *